3,019,192
COPOLYMERS OF 2-CHLOROBUTADI-1,3-ENE AND α-CHLORACRYLONITRILE

Anton R. Heinz and Wilhelm Graulich, Leverkusen, Germany, assignors to Farbenfabriken Bayer Aktiengesellschaft, Leverkusen, Germany, a corporation of Germany
No Drawing. Filed Dec. 8, 1958, Ser. No. 778,591
Claims priority, application Germany Dec. 7, 1957
1 Claim. (Cl. 260—85.5)

It is known that 2-chlorobutadi-1,3-ene (chloroprene) shows little tendency to copolymerise with other unsaturated compounds.

It has now been found that chloroprene can be copolymerised with α-chloracrylonitrile in any desired ratio, in aqueous emulsions.

The polymerisation is preferably carried out in a slightly alkaline medium, pH values of about 7 to 11 having proved particularly suitable. If this pH value is exceeded, the mixtures tend to precipitate as coagulates. The conventional buffer systems, such as for example pyrophosphates, are suitable for adjusting the pH value. According to another feature of the invention, iodoform is preferably used for regulating the copolymerisation, and amounts of 0.2 to 2 percent, calculated on the total weight of the monomers, are particularly effective. Depending on the quantity of regulator used, either plastic and readily soluble copolymers are obtained, or even hard copolymers, which can be vulcanised according to conventional processes. In this case, the more strongly regulated plastic copolymers are of particular interest, since they can be mixed directly with vulcanising agents and fillers without first being plasticised on the roller. This discovery is surprising, since other regulators such as for example dodecyl mercaptans or diisopropyl xanthogen disulphide (diperoxide) show an inadequate effect, even when using substantially larger quantities.

Copolymers with particularly valuable properties are obtained when the α-chloracrylonitrile is used in quantities of about 0.1 to 70 percent, based on the total weight of the monomers, whereby copolymers containing about 0.1 to 60 perecent by weight of copolymerised α-chloracrylonitrile are obtained.

The emulsion polymerisation of the components according to the present invention can be carried out at relatively low temperatures, such as for example 5 to 60° C., preferably 5 to 30° C., using conventional radical-forming polymerisation catalysts, such as for example peroxides or persulphates. As emulsifiers, it is for example possible to use alkali salts of rosin soaps, by themselves or in combination with an auxiliary emulsifier, such as for example the sodium salt of dinaphthyl methane sulphonic acid which is obtained by condensation of naphthalene and formaldehyde in the presence of sulphuric acid. The other emulsifiers usually used for emulsion polymerisation are also suitable for the present purpose. The polymerisation is generally stopped with conventional agents, when the conversion reaches about 60 to 90 percent. Conventional stabilisers can be used for stabilising the mixtures. The residual monomers can be removed for example by vacuum treatment at elevated temperatures. For working-up purposes, the resulting latex may, for example, be coagulated by freezing in the form of an endless band, washed with water and dried. The rubber obtained is light in color, plastic, tacky and has good storage properties. Even when containing high proportions of combined α-chloracrylonitrile, it is readily soluble in for example toluene, benzene, methyl ethyl ketone and ethyl acetate.

The latices obtained by the present process are characterised by good storability, high solid contents, and high thermostability.

The rubbers can be vulcanised by using the conditions usually employed when vulcanising polychloroprene.

The vulcanisates obtained are characterised by the following properties:

(a) Their flame resistance;

(b) Their resistance to ozone, which is practically that of the chloroprene pure polymer disregarding the percentage composition of the rubber and is far superior to that of butadiene copolymers with a high nitrile content;

(c) Their swelling stability, with respect to aromatic and aliphatic hydrocarbons when the α-chloracrylonitrile contents exceed 35 percent, is superior to that of butadiene-acrylonitrile copolymers with a content of about 40 percent of acrylonitrile.

EXAMPLE

Copolymers are prepared from chloroprene and α-chloracrylonitrile, using the components and proportions indicated in Table 1. The polymerisation is so carried out that the emulsifier (1), the auxiliary emulsifier (2) and sodium pyrophosphate are dissolved in water; the monomers are added together with the regulator (iodoform); the oxygen is displaced by nitrogen; the mixture is emulsified and brought to the cited temperature, and thereafter the polymerisation is initiated by adding the catalyst. After reaching the indicated conversion values, copolymerisation was stopped by adding phenothiazine.

Table 1

[All figures are parts by weight unless otherwise indicated]

| No. | 1 | 2 | 3 | 4 | 5 | 6 |
|---|---|---|---|---|---|---|
| Chloroprene | 90 | 80 | 60 | 40 | 70 | 70 |
| α-chloracrylonitrile | 10 | 20 | 40 | 60 | 30 | 30 |
| iodoform | 0.46 | 0.63 | 0.86 | 1.09 | 0.73 | 0.77 |
| Water | 160 | 160 | 160 | 160 | 160 | 160 |
| Dresinate [1] | 3.5 | 3.5 | 3.5 | 3.5 | 4.0 | 4.0 |
| "Baykanol SF" [2] | 0.8 | 0.8 | 0.8 | 0.8 | 0.8 | 0.8 |
| Potassium persulphate | 0.15 | 0.15 | 0.15 | 0.15 | 0.003 | 0.002 |
| Temperature (° C.) | 12 | 12 | 12 | 12 | 40 | 55 |
| Conversion (percent) | 80 | 80 | 80 | 80 | 90 | 80 |
| Phenthiazine stopper | 0.1 | 0.1 | 0.1 | 0.1 | 0.1 | 0.1 |

[1] Sodium salt of a disproportionated abietic acid.
[2] Sodium salt of a condensation product of naphthalene, sulphuric acid and formaldehyde.
[3] Sodium anthraquinone sulphonate.

Table 2 gives information concerning the composition and properties of the vulcanised copolymers. The following specification was used for the vulcanisation, the figures being parts by weight:

Rubber _____ 100
Zinc oxide _____ 3
Magnesia usta _____ 4
Carbon black _____ 30
Stearic acid _____ 1
Paraffin _____ 0.6
Ethylene thiourea _____ 0.5
N-phenyl-α-naphthylamine _____ 2
Vulcanisation 40 minutes at 151° C.

Table 2

| No. | 1 | 2 | 3 | 4 | 5 | 6 | 7 | 8 |
|---|---|---|---|---|---|---|---|---|
| α-Chloracrylonitrile | 10 | 20 | 40 | 60 | 30 | 30 | | |
| chlorine content of the polymer in percent | 39.4 | 39.2 | 39.2 | 39.3 | 39.5 | 39.4 | | 39.5 |
| Nitrogen content of the polymer in percent | 1.85 | 3.48 | 6.25 | 7.70 | 4.92 | 4.72 | 13.0 | |
| α-chloracrylonitrile in the polymer in percent | 11.8 | 21.6 | 39.0 | 48.3 | 30.7 | 29.5 | | |
| Defo value/80° C | 350/16 | 300/10 | 250/12 | 550/11 | 600/18 | 400/12 | 1,000/23 fracture | 500/24 |
| Ozone resistance a | 0–1 | 0–1 | 0–1 | 0–1 | 0–1 | 0–1 | | 0–1 |
| Volume percent Swelling b: | | | | | | | | |
| in benzine | 32 | 17 | 1.3 | 0.4 | 5.3 | 4.9 | 3.5 | 55 |
| in benzene | 282 | 265 | 190 | 97 | 238 | 244 | 155 | 290 | a 0=undamaged, 1=25 percent, 2=50 percent, 3=75 percent, 4=100 percent damaged. Duration of the ozone action, 20 hours at 60 percent tension.
b Duration of the operation, each 24 hours at 50° C.
7=Copolymer of 60 parts of butadiene and 40 parts of acrylonitrile
8=Chloroprene polymer.

We claim:

An improved copolymerisation process which comprises subjecting a mixture of chloroprene and alpha-chloracrylonitrile to polymerization in an aqueous emulsion at a pH of 7–11 and a temperature of 5–60° C. in the presence of iodoform, the alpha-chloracrylonitrile being used in amounts of about 0.1–70% by weight of the above two monomers, and the iodoform being employed in quantites of about 0.2–2% based on the weight of monomers.

References Cited in the file of this patent
UNITED STATES PATENTS

| | | |
|---|---|---|
| 2,382,812 | Parker | Aug. 14, 1945 |
| 2,384,889 | Clifford et al. | Sept. 18, 1945 |
| 2,463,225 | Vincent | Mar. 1, 1949 |
| 2,510,426 | Smith | June 6, 1950 |